(12) United States Patent
Monestier et al.

(10) Patent No.: US 10,711,956 B2
(45) Date of Patent: Jul. 14, 2020

(54) THERMALLY STABLE FLEXIBLE LIGHTING DEVICE

(71) Applicant: Lumileds LLC, San Jose, CA (US)

(72) Inventors: Florent Monestier, Kerkrade (NL); Christian Kleijnen, Ell (NL)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/349,772

(22) PCT Filed: Oct. 12, 2018

(86) PCT No.: PCT/EP2018/077944
§ 371 (c)(1),
(2) Date: May 14, 2019

(87) PCT Pub. No.: WO2019/076771
PCT Pub. Date: Apr. 25, 2019

(65) Prior Publication Data
US 2019/0277461 A1    Sep. 12, 2019

(30) Foreign Application Priority Data

Oct. 16, 2017   (EP) .................................... 17196611

(51) Int. Cl.
*F21S 10/00*       (2006.01)
*F21S 4/22*        (2016.01)
(Continued)

(52) U.S. Cl.
CPC ................ *F21S 4/22* (2016.01); *F21V 15/01* (2013.01); *G02B 6/0095* (2013.01); *F21V 3/062* (2018.02);
(Continued)

(58) Field of Classification Search
CPC ....... F21S 4/22; F21S 4/24; F21S 4/00; F21V 15/01; F21V 3/062; F21V 15/012;
(Continued)

(56) References Cited

U.S. PATENT DOCUMENTS

2006/0146540 A1*  7/2006  Reo .......................... F21V 5/008
                                                            362/332
2015/0062890 A1*  3/2015  Camarota ................. F21K 9/69
                                                            362/223
(Continued)

FOREIGN PATENT DOCUMENTS

DE        202005002425 U1    4/2005
EP             2447031 A1    5/2012
(Continued)

*Primary Examiner* — Y. M. Quach Lee
(74) *Attorney, Agent, or Firm* — Volpe and Koenig, P.C.

(57) ABSTRACT

A lighting device comprises at least one LED element for emitting light into an emission direction. A bendable light guide is arranged to guide light emitted from the LED element. The bendable light guide comprises at least a first portion formed of an elastic, light transmitting light guide material covering at least the emission direction of the LED element, and a second portion formed of an elastic, light transmitting light guide material. In order to be able to function under varying environmental conditions, the second portion is arranged spaced from the first portion in the emission direction by a separation space.

12 Claims, 5 Drawing Sheets

(51) Int. Cl.
  *F21V 15/01*   (2006.01)
  *F21V 8/00*    (2006.01)
  F21Y 103/10    (2016.01)
  F21Y 115/10    (2016.01)
  F21V 3/06      (2018.01)

(52) U.S. Cl.
  CPC ....... *F21Y 2103/10* (2016.08); *F21Y 2115/10* (2016.08)

(58) Field of Classification Search
  CPC ...... F21V 17/16; F21V 17/162; F21V 17/164; F21V 3/06; F21V 3/0625; G02B 6/0095; F21Y 2103/10; F21Y 2115/10
  See application file for complete search history.

(56) References Cited

U.S. PATENT DOCUMENTS

2015/0217840 A1   8/2015  Taylor
2017/0254518 A1*  9/2017  Vasylyev ............... F21V 17/007

FOREIGN PATENT DOCUMENTS

WO   2005/106320 A1   11/2005
WO   2014/026888 A1   2/2014

* cited by examiner

THERMALLY STABLE FLEXIBLE LIGHTING DEVICE

FIELD OF THE INVENTION

The invention relates to a lighting device. More specifically, the invention relates to a lighting device including one or more LED elements and a light guide arranged to guide light emitted from the LED elements.

BACKGROUND OF THE INVENTION

Lighting devices comprising LED elements are used for an ever increasing number of lighting applications. A lighting device may comprise a light guide arranged to guide light emitted from an LED element. The light guide may serve different optical functions, e.g. to collimate, diffuse, mix, or direct the emitted light.

SUMMARY OF THE INVENTION

It may be considered an object to provide a lighting device with at least one LED element and a light guide, which is operable under changing environmental conditions.

The object may be achieved by a lighting device according to claim 1. Dependent claims relate to preferred embodiments of the invention.

The present inventors have considered lighting devices including one or more LED elements and a bendable light guide arranged at the LED elements. One possible material for a bendable light guide is silicone, which is an elastic, light transmitting material which is inexpensive and easy to process. However, the inventors have observed that the thermal expansion of silicone or other comparable light guide materials may be relatively high compared for example to the thermal expansion of electrical conductors connected to the LED element. The inventors have concluded that temperature changes may lead to significant mechanical stress and thus increase the risk of mechanical failure.

The total amount of thermal expansion of a volumetric part depends on the volume. Thus, in order to reduce adverse influence of temperature changes and mismatch of the coefficient of thermal expansion (CTE), the inventors propose to reduce the volume of light guide material in contact with the LED element.

According to the invention, at least one LED element is provided for emitting light into an emission direction. The term "LED element" refers to any solid-state lighting element including any type of light emitting diode, organic light emitting diode etc. One LED element may comprise multiple light emitting diodes arranged closely together. The term "emission direction" denotes any direction into which light is emitted during operation of the LED element. Generally, LED elements will emit light into a plurality of directions. An unpackaged LED die, which is preferably used in the present context, is a Lambertian emitter. Packaged LED elements may have a more limited emission angle, but will still include different emission directions. Preferably, the emission direction considered in the context of the present invention is the main emission direction, i.e. the direction of maximum intensity, which for a Lambertian emitter is perpendicular to the die surface.

While the general concept of the invention is applicable to a lighting device comprising only a single LED element, preferred embodiments of lighting devices will comprise a plurality of LED elements, preferably in spaced arrangement, in particular arranged in at least one line along a common axis or in a common plane. In particular, the advantageous effects of the invention apply to lighting devices with a high aspect ratio (length divided by width or height), such as to lighting devices of elongate shape with LED elements spaced along the length thereof. For example, the aspect ratio of preferred embodiments may be 2 or more, preferably 5 or more.

The lighting device according to the invention further comprises a bendable light guide arranged to guide light emitted from the LED element. A light guide is understood to be a solid element of light transmitting material, which guides light internally. While the material is preferably transparent, this may also comprise translucent materials e.g. with optically diffusive properties. Light traversing the interior of the light guide may, in some cases, undergo total internal reflection at boundary surfaces, however this is not a requirement. The light guide is bendable, i.e. the light guide and preferably the entire lighting device may be bent, e.g. to conform to the contour of a part on which the light guide and/or the lighting device is mounted. Preferably, the light guide is disposed such that it may be bent at least in one bending direction to a bending radius of below 5 meters, preferably below 3 meters, most preferably 1 m or below. In order to achieve a bendable light guide, it is at least partly made of elastic material(s). The term "elastic" may e.g. be understood to denote materials with a modulus of elasticity (Young's modulus) of below 5 GPa, preferably at or below 1 GPa, particularly preferably 0.3 GPa or below. A preferred material for the first light guide is Silicone, e.g. with a Young's modulus of below 0.1 GPa.

According to the invention, the light guide comprises at least two separate portions. A first portion of the light guide is formed of an elastic light transmitting light guide material and covers at least the emission direction of the LED element. Preferably, the first portion of the light guide contacts the LED element in the emission direction. This allows good optical coupling. Particularly preferably the LED element is at least partially embedded within the light guide material of the first light guide portion, which ensures both good optical coupling and mechanically stable connection, in particular in the preferred case of an unpackaged LED element.

According to the invention, the lighting device further includes a second portion of the light guide, which may be made of the same elastic light transmitting material as the first portion, in particular silicone, or of a different material. The second portion of the light guide is arranged spaced from the first portion in the emission direction by a separation space. The separation space arranged between the first and second light guide portion may be filled with a solid or liquid material of optical properties different from those of the light guide material, but preferably is free space, i.e. evacuated or filled with a gas, in particular air.

Light emitted from the LED element and guided by the first portion of the light guide may traverse the separation space to be further guided by the second portion of the light guide.

The separation space serves to mechanically decouple the first and second portions of the light guide. Both portions are separately affected by shrinkage or expansion due to temperature changes, according to their individual volume. As the first light guide portion arranged at the LED element constitutes only a fraction of the total volume of the light guide, separation of the two portions can limit the effect of thermal changes acting on the LED element. Generally, while the lighting device may have a small thickness (or height), a certain length of the optical path, i.e. distance between the LED element and a light emitting surface, is preferred to allow light spreading and uniformity on the light emitting surface.

In a preferred embodiment, the first and second portion of the light guide are connected by a deformable spring structure. The spring structure may serve to mechanically connect the first and second light guide portion, however not in a rigid manner, but allowing the relative arrangement of the two portions to vary by deformation of the spring structure. This may e.g. include different types of relative movement of the two light guide portions, such as e.g. tilting, shifting etc. Preferably, by deformation of the spring structure, the distance between the first and second light guide portions and thus the width of the separation space may vary. In particular, it is preferred that the spring structure is deformable to achieve a variable length in the emission direction.

In a preferred embodiment, the deformable spring structure comprises at least a first and a second spring element arranged spaced from each other in a direction perpendicular to the emission direction. The separation space may be arranged between the first and second spring elements. By providing two spaced spring elements, it is in particular possible to achieve a variable width of the separation space while retaining an aligned orientation of the first and second light guide portions (i.e. in particular avoiding relative tilt of the two portions, e.g. keeping them in parallel orientation).

The spring structure may be formed in different shape and/or be made of different suitable materials. For example, the spring function rendering the structure deformable may be achieved by an elastic material, which can expand or contract due to external forces applied. Also, the spring function may be achieved by a spring shape, in particular a shape comprising bends or folds, preferably forming at least one loop.

In a preferred embodiment, the spring structure may comprise a wall portion, in particular a flat member, which may have at least one folded or bent wall portion. For example, the folded or bent wall portion may include at least a first fold or bend in a first folding or bending direction and a second fold or bend in a second, opposite folding or bending direction. Preferably, a loop structure may be formed including at least three bends or folds in consecutively opposite folding/bending directions. The bends or folds may have bending/folding angles of e.g. at least 30°, preferably at least 60°, particularly preferably at least 85°.

The spring structure may be formed such that at least a part thereof projects into the separation space.

In a preferred embodiment, the folded wall portion may have a wall thickness which is at least substantially (e.g. within +/−25%, preferably +/−10%) constant. A spring coupling between the first and second light guide portions which allows a high degree of relative motion may in particular be formed if the first and second portions of the light guide are separated by a distance of at least four times the wall thickness. This allows e.g. a spring structure with four consecutive bends of at least substantially 90° (e.g. +/−15°), e. g. as shown in the drawings of preferred embodiments.

It is possible to form the deformable spring structure of the same material as the first and/or the second light guide portion. In particular, the spring structure may be formed as an integral part of the light guide, e.g. formed in one piece with both the first and second light guide portions. However, according to a preferred embodiment, the light guide may be arranged within an enclosure and the deformable spring structure may be formed by a portion of this enclosure.

In a particularly preferred embodiment, the enclosure may be formed by a highly reflective material, e.g. with reflectivity of 90% or more at least on the inner surfaces directed towards the light guide and/or separation space. This prevents a loss of light. For example, the enclosure may be made of a flexible material such as silicone with dispersed inorganic particles.

In some embodiments, the LED element may be a first LED element mounted on a conductor structure. At least one, preferably multiple further LED elements may also be provided on the conductor structure in spaced apart arrangement. In particular, it is preferred to provide a lead frame, onto which one or more packaged LEDs or unpackaged LED dies are mounted. A further electrical contact of the LED element may e.g. be provided by a bond wire. The LED elements may be arranged e.g. in at least one line oriented perpendicular to the emission direction.

In a particularly preferred embodiment, the LED elements and the conductor structure may be at least partly embedded within the first portion of the light guide. This allows to achieve good mechanical stability along with a high degree of optical coupling.

In order to allow bending of the lighting device, the conductor structure is preferably bendable. For example, the conductor structure may comprise thin tracks of metal, e.g. copper or a copper containing alloy. The conductor structure may e.g. have a thickness of less than 2 mm, preferably 1 mm or less.

As described above, the total volume of the light guide is divided up into at least the first and second light guide portions. In different embodiments, the relative volume and/or thickness of the two portions and of the separation space in between may vary. Generally, it is preferred to limit the volume and/or thickness of the first portion arranged in contact with the LED element. In preferred embodiments, the thickness of the first light guide portion may be chosen to be equal to or less than the thickness of the second light guide portion. For the purposes of this comparison, the thickness may be measured in the (main) emission direction. The separation space may have a thickness, measured in the emission direction, of at least 20% of the sum of the first and second thickness of the first and second light guide portions.

In a preferred embodiment, at least one surface of the first light guide portion and/or of the second light guide portion facing the separation space comprises a modulated surface shape, i.e. the surface is not plane, but may comprise elevated portions and/or depressions. Such a modulated surface shape may be used to obtain desired optical properties of the transmission of light from the first light guide portion through the separation space into the second light guide portion. Since the interior surfaces of the light guide portions (i.e. those surfaces facing the separation space) constitute boundary surfaces to the usually air-filled separation space, at least portions of the transmitted light may undergo refraction, or in the case of the internal surface of the first light guide portion even total internal reflection. The surface shape may be used to obtain a desired light distribution, e.g. to either homogenize the light output at a light output surface, or to deliberately obtain an inhomogenous distribution including desired bright spots on the light output surface.

These and other aspects of the invention will be apparent from and elucidated with reference to the embodiments described hereinafter.

DETAILED DESCRIPTION OF EMBODIMENTS

Figure 1:
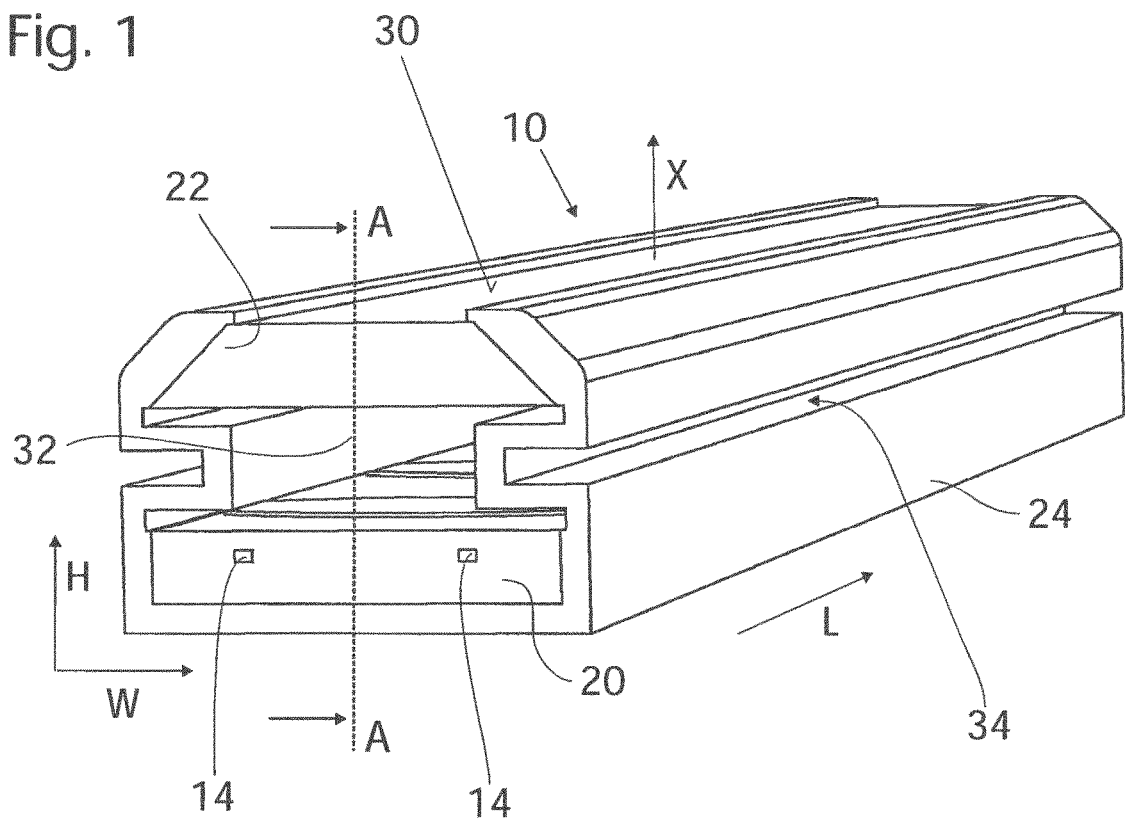
FIG. 1 shows a perspective view of an embodiment of a lighting device.
Figure 2:
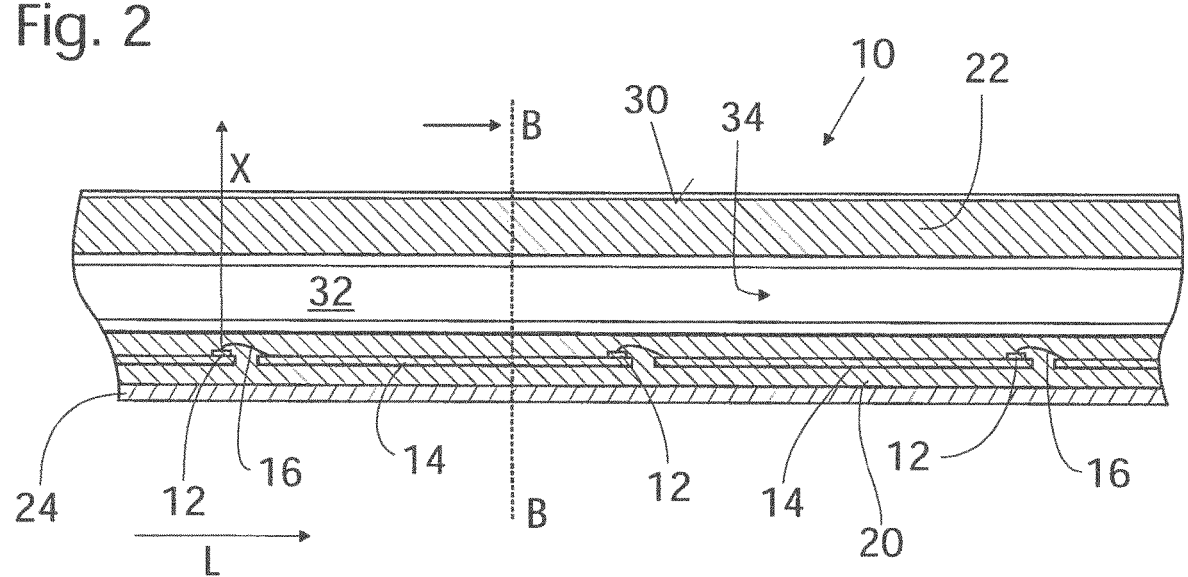
FIG. 2 shows a partial sectional view of the lighting device of FIG. 1 with the section along the line A . . . A in FIG. 1.
Figure 3:
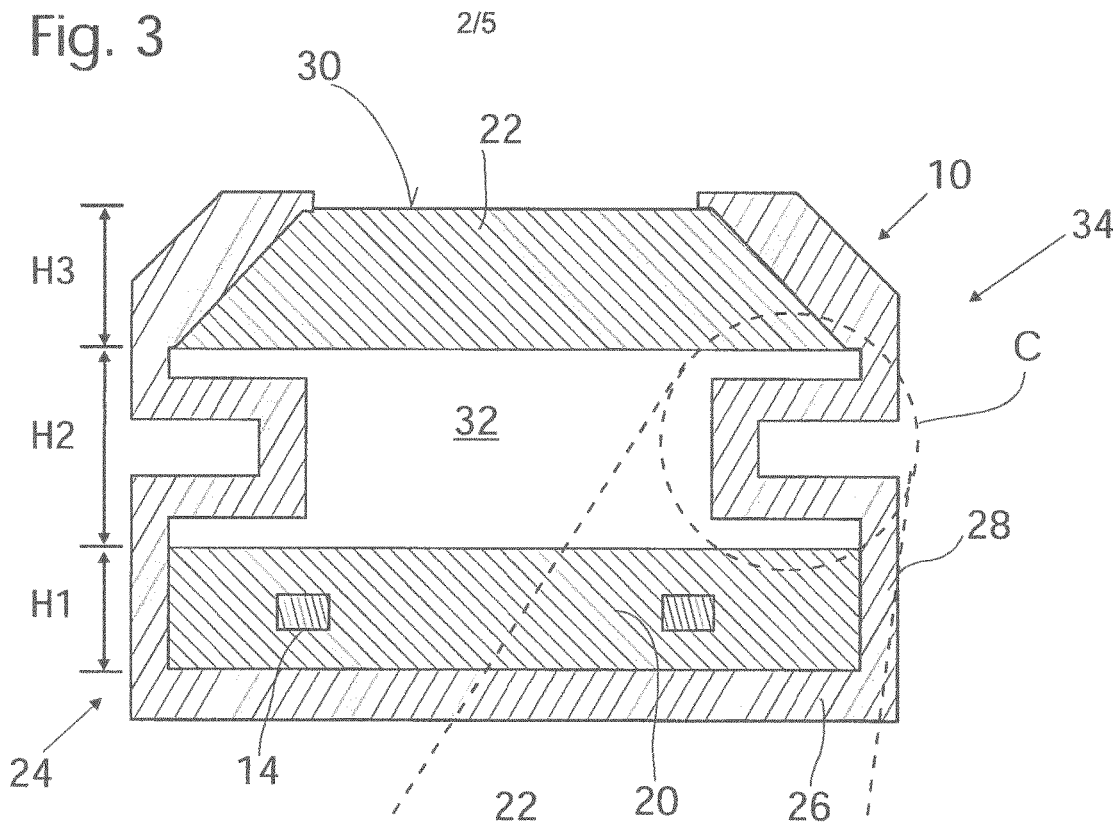
FIG. 3 shows a sectional view of the lighting device of FIG. 1, FIG. 2 with the section along the line B . . . B in FIG. 2.

FIG. 1-3 show a first embodiment of a lighting device 10. The lighting device 10 is of elongate shape with a high aspect ratio, i. e. with a long extension in length direction L as compared to width W and height H.

The lighting device 10 comprises, as shown in FIG. 2, a plurality of spaced apart LED elements 12 provided as unpackaged LED dies mounted on conductor elements 14 of a lead frame and further contacted by bond wires 16. The LED elements 12 are arranged in a line extending in longitudinal direction L. Their main emission direction X is directed along the height direction H of the lighting device 10.

The lighting device 10 further comprises a light guide comprised of a first light guide portion 20 and a second light guide portion 22. The light guide and the LED 3o elements 12 mounted on the lead frame 14 are contained within an enclosure 24.

The light guide portions 20, 22 are solid bodies made of transparent silicone. The enclosure 24 is a hollow body with a shape as visible from the sectional view of FIG. 3, 3a. The enclosure 24 is comprised of a bottom wall 26 and opposite sidewalls 28 enclosing the light guide portions 20, 22 except for a light emission surface 30 at the top of the lighting device 10.

The walls 26, 28 of the enclosure 24 are, in the preferred embodiment, made of silicone with dispersed $TiO_2$ particles, so that the surface of the enclosure 24 is diffusely reflective with a high reflectivity of more than 90%. Thus, the enclosure 24 forms a "white box" enclosing the light generating and transmitting elements of the lighting device 10. Due to the high reflectivity, a large amount of the light emitted from the LED elements 12 is emitted through the light emitting surface 30.

In the preferred embodiment, the silicone material of the light guide portions 20, 22 is very elastic, with a modulus of elasticity of around 3 MPa. The filled silicone material of the enclosure 24 is also elastic with a modulus of elasticity of around 20 MPa. The lead frame conductors 14 are thin, in this example with a 0.25 mm thickness.

Due to these mechanically flexible properties of both the light guide portions 20, 22 and the enclosure 24, as well as the thin lead frame conductors 14, the entire lighting device 10 is flexible and may be bent and shaped as required for different lighting purposes. In particular, the lighting device 10 may be bent to follow the contour of a part on which it is mounted. In a preferred example, the lighting device may be bent up to a bending radius of 25 cm. While the light guide portions 20, 22 and enclosure 24 could be bent to even smaller bending radii, the risk of mechanical failure of the lead frame conductors 14, LED elements 12 and bond wires 16 increases with stronger bending.

As visible in particular from the sectional view of FIG. 2, the lead frame conductors 14, LED elements 12 and bond wires 16 are embedded within the first light guide portion 20. Thus, the sensitive unpackaged LED dies 12 and bond wires 16 are well protected and mechanically held by the surrounding light guide material. Also, a good optical coupling is achieved, such that light emitted from the LED elements 12 is coupled into the first light guide portion 20.

The first and second light guide portions 20 are separated, in the height direction H, which is also the main light emission direction X, by a separation space 32, which in the preferred examples is an air-filled cavity. Light emitted from the LED elements 12 is first guided in the interior of the first light guide portion 20, then transmitted through the separation space 32 into the second light guide portion 22, before being emitted from the light emission surface 30.

The light guide portions 20, 22 are arranged in parallel at a distance H2 (FIG. 3) to form the separation space 32. As shown in the sectional view of FIG. 3, the first light guide portion 20 has a thickness H1 in height direction H and the second light guide portion 22 has a thickness H3 in height direction H. Thus, the total height of the device 10 is determined (except for the wall thickness of the bottom wall 26 of the enclosure 24) by the thickness H1, H3 of the two light guide portions 20, 22 and the thickness H2 of the separation space 32. In the example shown, the thickness H1 of the first light guide portion is slightly less than the thickness H3 of the third light guide portion. The thickness of the separation space is smaller than the sum of the thickness H1+H3 of both light guide portions 20, 22.

The opposite side walls 28 of the enclosure 24 connecting the light guide portions 20, 22 are provided, in the preferred embodiment shown, with spring structures 34 provided on both sides of the separation space 32 and spaced separated in width direction W.

In the example shown, the spring structures 34 are formed as folded wall portions. The side walls 28 which have an at least substantially constant thickness w are folded in four consecutive 90° bends 36a, 36b, 36c, 36d to form a loop 38, which projects into the separation space 32.

Figure 3A:
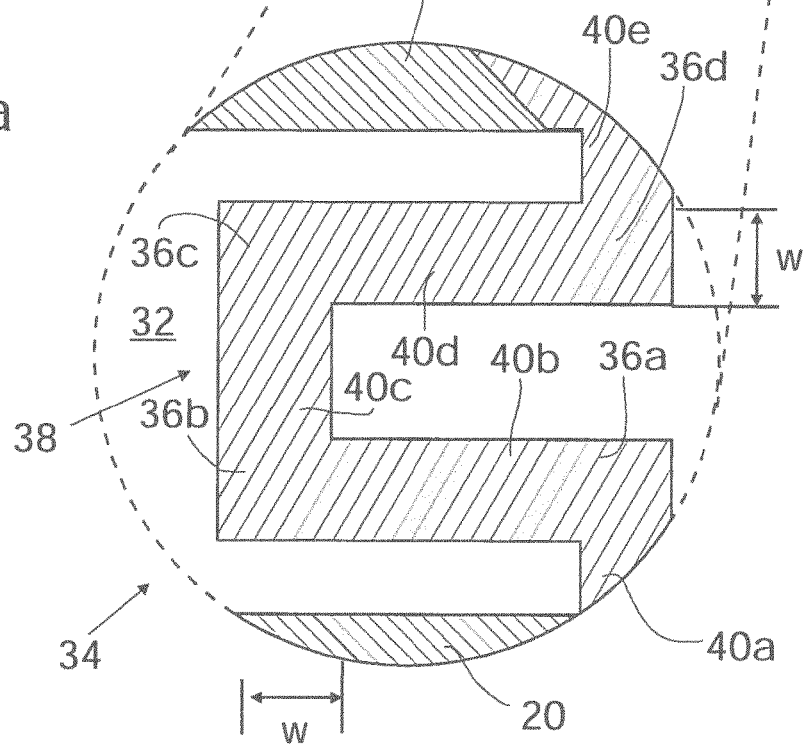
FIG. 3a shows an enlarged portion of the area denoted C in FIG. 3.

As shown in FIG. 3, 3a, the spring structures 34 according to the preferred embodiment of the invention comprise wall portions 40a-e, each arranged under 90° to each other. Wall portions 40a, 40c, 40e extend in height direction H, whereas wall portions 40b, 40d extend in width direction W. In order to retain sufficient space in height direction H, in particular between parallel surfaces, the parallel wall portions 40b, 40d of the loop 34 are arranged at a distance at least equal to the wall thickness w. Also, the wall portions 40b, 40d are arranged at a distance in parallel to the light guide portions 20, 22 to leave sufficient space for the spring structure 34 to expand or contract in height direction H.

The purpose of dividing the light guide into separate light guide portions 20, 22 connected by the spring structure 34 is to reduce mechanical stress caused in case of temperature variations by the mismatch between the relatively large coefficient of thermal expansion (CTE) of silicone as compared to the CTE of the lead frame conductor material.

Figure 4:
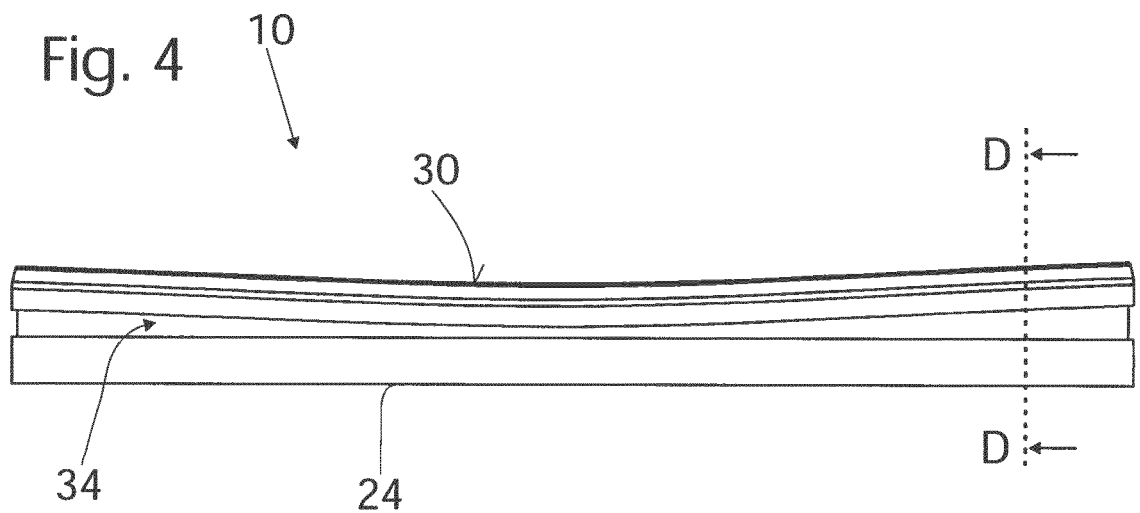
FIG. 4 shows a side view of a deformed lighting device.

In order to show an example of the effects caused by thermal expansion, FIG. 4 shows a side view of the lighting device 10 at increased temperature. Due to different thermal expansion, the lighting device 10 appears bent. However, the mechanical stress exerted on the lead frame 14 is limited only to the expansion of the first light guide portion 20 which is in direct contact with the lead frame 14 and LED elements 12. The second light guide portion 20 is mechanically decoupled from the first light guide portion 20 and from the lead frame 14 by the separation space 32. Thus, expansion and subsequent bending due to thermal expansion of the second light guide portion 22 does not cause significant mechanical stress acting on the lead frame 14.

Figure 5:
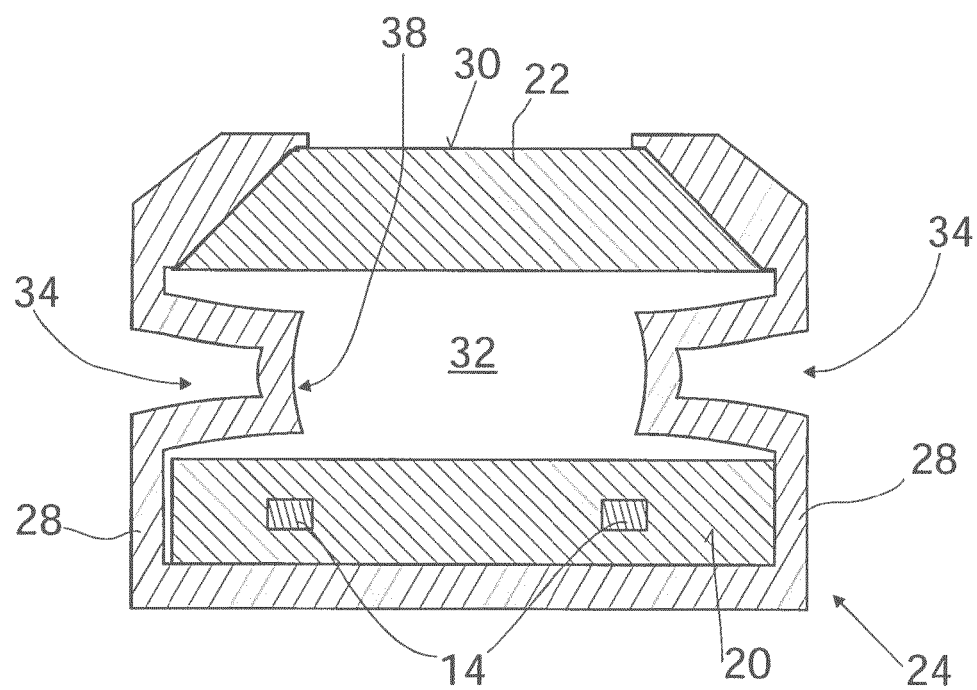
FIG. 5 shows a sectional view of the deformed lighting device of FIG. 4 with the section taken along the line D . . . D in FIG. 4.

FIG. 5 also shows the mechanical function of the spring structures 34 in both side walls 28 of the enclosure 24. By deformation of the spring structures 34, in the example shown by widening of the loops 38, the spring structures 34 retain the connection between the first and second light guide portions 20, 22 while allowing relative movement of these portions 20, 22. The forces generated by elements expanding differently under the influence of increased temperature deform the spring structures 34 elastically, thus decoupling any mechanical stress from the first light guide portion 20 and lead frame 14 embedded therein.

While the shape in cross section shown in FIGS. 1-5 and discussed above corresponds to the currently preferred embodiment, advantageous effects of limiting the influence of thermal expansion on the lead frame 14 may alternatively be achieved by different structures. Some examples of alternative embodiments are shown in FIGS. 6a6d.

Figure 6A:
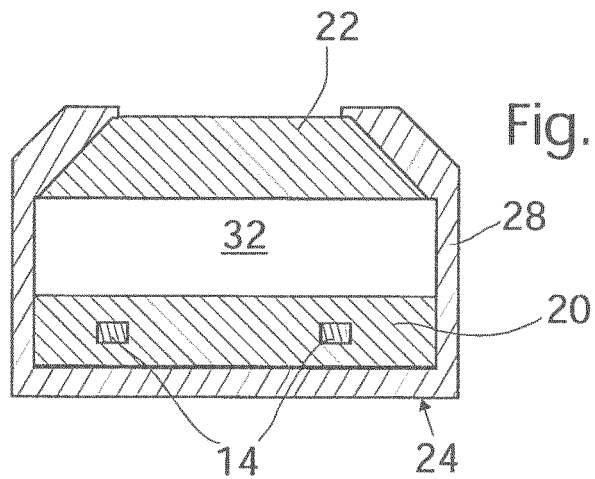
FIGS. 6a-6d show sectional views of alternative embodiments of lighting devices

In FIG. 6a, the side walls 28 of the enclosure 24 extend straight in height direction H, i. e. there is no folded wall portion. It is possible to obtain a mechanical 3o decoupling effect by elastic properties of the sidewalls 28 on both sides of the separation space 32 alone, without forming loops. Also, even without a spring structure, the embodiment of FIG. 6a shows the separation of the light guide portions 20, 22, which limits the influence of thermal expansion of the second light guide portions 22 on the lead frame 14.

Figure 6B:
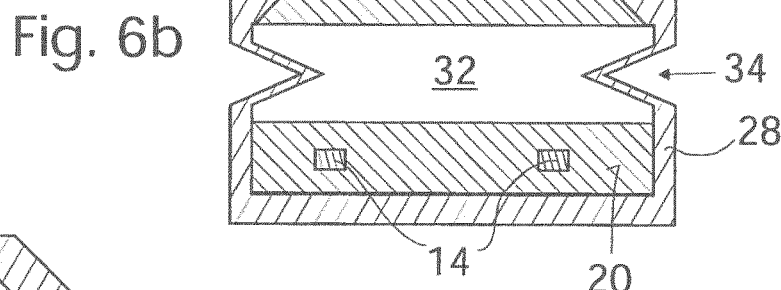
Figure 6C:
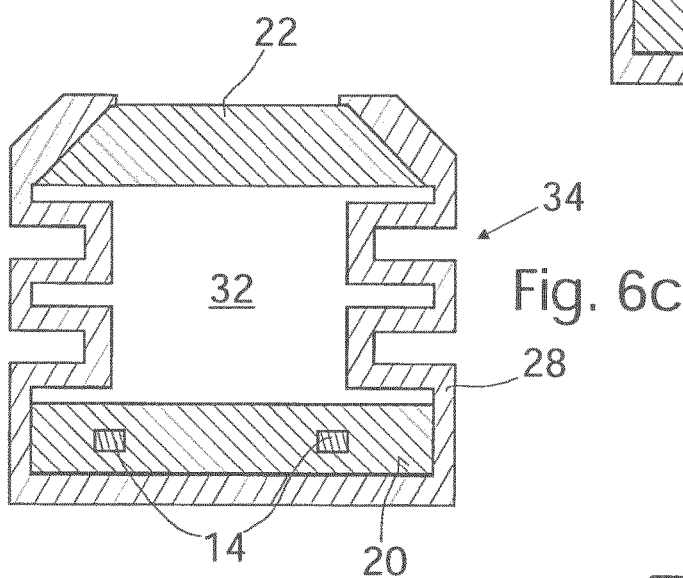

FIGS. 6b, 6c show examples of different shapes of spring structures formed in the side walls 28. As visible from these embodiments, folded wall portions 34 may be formed with shapes different from the preferred first embodiment.

Figure 6D:
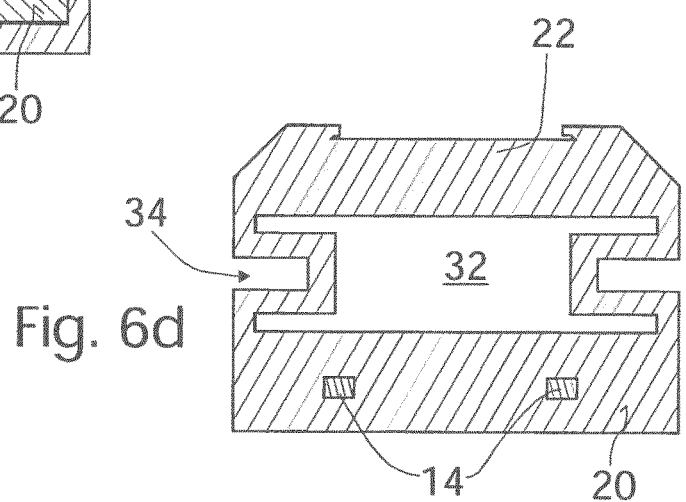

In the embodiment according to FIG. 6d, the spring structures 34 are formed in one piece together with the first and second light guide portions 20, 22.

Figure 7A:
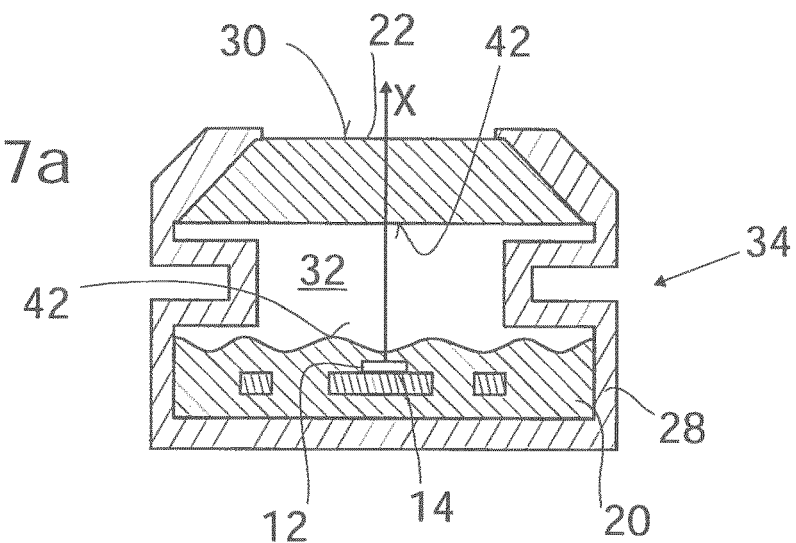
FIGS. 7a-7c show sectional views of still further alternative embodiments of lighting devices.
Figure 7B:
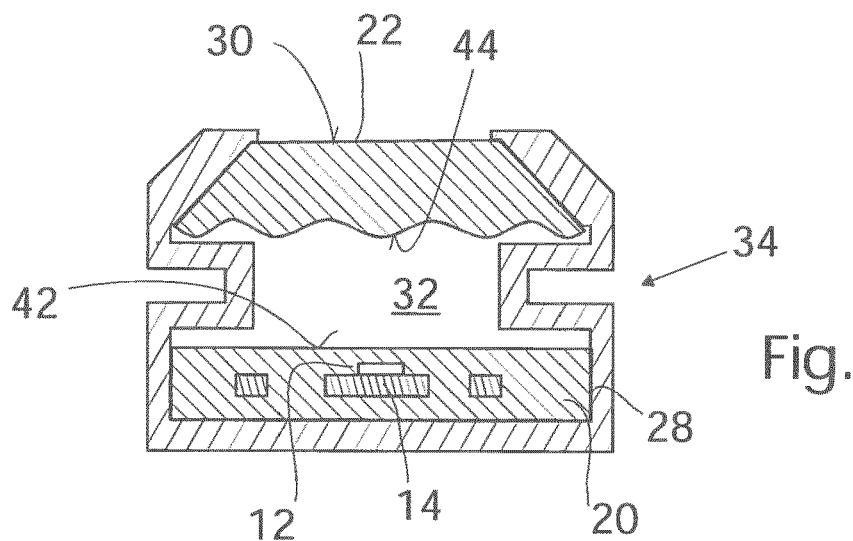
Figure 7C:
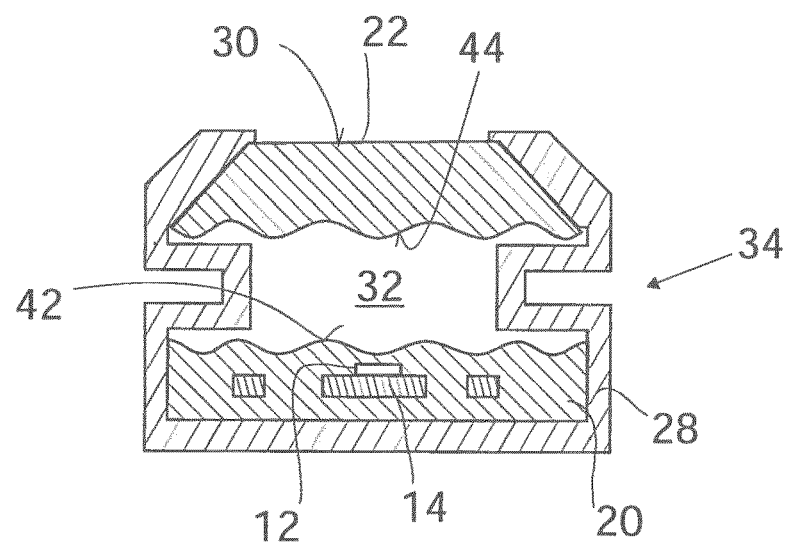

FIGS. 7a-7c show further different embodiments. In the embodiment of FIG. 7a, the internal surface 42 of the first light guide portion 20 is not plane but has a modulated surface shape with depressions and elevated portions. By the choice of the specific surface shape, the optical properties of transmission/refraction of light emitted from the LED elements 12 and guided through the first light guide portion 20 into the separation space 32 may be altered. For example, since different portions of the modulated surface 42 are arranged at different angles, some light portions emitted from the LED element 12 which would undergo total internal reflection at a plane surface may be transmitted into the separation space 32. In the embodiment of FIG. 7b, the internal surface 44 of the second light guide portion 22 is a modulated surface, whereas the internal surface 42 of the first light guide portion is plane. In the embodiment of FIG. 7c, both the internal surface 44 of the second light guide portion 22 and the internal surface 42 of the first light guide portion 20 have a modulated surface shape.

It should be noted, that the above described embodiments illustrate rather than limit the invention and that those skilled in the art will be able to design many further alternative embodiments without departing from the scope of the claims.

In particular, the lighting devices 10 may have different shape and aspect ratio, with the advantageous effect of the invention being most notable for higher aspect ratios. Of course, type and arrangement of the LED elements 12 as well as the electrical interconnection via conductors 14 may vary in different embodiments.

In the claims, any reference signs shall not be construed as limiting the claims. The word "comprising" does not exclude the present of elements of steps other than those listed in the claims. The indefinite article "a" or "an" proceeding any element does not exclude the presence of a plurality of such elements. The mere fact that certain measures are recited in mutually different dependent claims, or that elements are shown only for mutually different embodiments, does not indicate that a combination of these measures can not be used to advantage.

The invention claimed is:

1. A lighting device, comprising:
   at least one LED element for emitting light into an emission direction; and
   a bendable light guide arranged to guide light emitted from the at least one LED element;
   wherein the bendable light guide comprises at least a first portion and a second portion,
   wherein the first portion is formed of an elastic, light transmitting light guide material covering at least the emission direction of the at least one LED element,
   wherein the second portion is formed of an elastic, light transmitting light guide material, the second portion being arranged spaced from the first portion in the emission direction by a separation space,
   wherein the first portion and the second portion of the light guide are connected by a deformable spring structure,
   wherein the deformable spring structure comprises at least one folded wall portion, and
   wherein the at least one folded wall portion includes at least a first fold in a first folding direction and a second fold in a second, opposite folding direction, such that there is an open space between the first folding direction and the second folding direction to allow a distance between the first and second light guide portions to vary.

2. The lighting device according to claim 1, wherein the deformable spring structure is deformable to achieve a variable length in the emission direction.

3. The lighting device according to claim 1, wherein the deformable spring structure comprises at least a first spring element and a second spring element,
   the first spring element and the second spring element being arranged spaced from each other in a direction perpendicular to the emission direction,
   the separation space being arranged between the first spring element and the second spring element.

4. The lighting device according to claim 1, wherein at least a part of the deformable spring structure projects into the separation space.

5. The lighting device according to claim 1, wherein the at least one folded wall portion has a wall thickness, and
   the first portion and the second portion of the light guide are separated by a distance of at least four times the wall thickness.

6. The lighting device according to claim 1, wherein the light guide is arranged within an enclosure, and
   the deformable spring structure is formed by a portion of the enclosure.

7. The lighting device according to claim 1, wherein the at least one LED element is a first LED element mounted on a conductor structure, at least one other LED element also being mounted on the conductor structure, the other LED element being arranged spaced from the first LED element.

8. The lighting device according to claim 7, wherein the first LED element, the at least one other LED element and the conductor structure are at least partially embedded within the first portion of the light guide.

9. The lighting device according to claim 7, wherein the first LED element and the at least one other LED element are arranged in at least one line, the line being arranged perpendicular to the emission direction.

10. The lighting device according to claim 1, wherein the first portion of the light guide has a first thickness in the emission direction and the second portion of the light guide has a second thickness in the emission direction, and
the separation space has a third thickness measured in the emission direction of at least 20% of the sum of the first thickness and the second thickness.

11. The lighting device according to claim 1, wherein the first light guide portion and the second light guide portion are made of silicone.

12. The lighting device according to claim 1, wherein a surface of the first light guide portion faces the separation space and a surface of the second light guide portion faces the separation space, and
at least one of the surface of the first light guide portion and the surface of the second light guide portion comprises a modulated surface shape.

\* \* \* \* \*